US006179546B1

(12) United States Patent
Citrowske

(10) Patent No.: US 6,179,546 B1
(45) Date of Patent: Jan. 30, 2001

(54) EXTERNALLY STOWED WHEELCHAIR LIFT

(75) Inventor: Richard J. Citrowske, Hamlake, MN (US)

(73) Assignee: RC Sales and Manufacturing, Ilam Lake, MN (US)

( * ) Notice: Under 35 U.S.C. 154(b), the term of this patent shall be extended for 0 days.

(21) Appl. No.: 08/921,732

(22) Filed: Aug. 27, 1997

(51) Int. Cl.[7] ........................................................ B60P 1/44

(52) U.S. Cl. .......................... 414/558; 414/917; 414/921; 414/543

(58) Field of Search ..................................... 414/539, 540, 414/541, 543, 544, 545, 546, 550, 556, 558, 917, 921; 254/10 R, 10 B, 10 C

(56) References Cited

U.S. PATENT DOCUMENTS

| | | | |
|---|---|---|---|
| 3,263,835 | 8/1966 | Lugash . | |
| 4,026,387 | 5/1977 | Abreu . | |
| 4,134,504 | 1/1979 | Salas et al. . | |
| 4,711,613 | 12/1987 | Fretwell . | |
| 4,909,700 | 3/1990 | Fontecchio et al. . | |
| 4,958,979 | 9/1990 | Svensson . | |
| 5,158,419 | 10/1992 | Kempf et al. . | |
| 5,253,973 | 10/1993 | Fretwell . | |
| 5,375,962 | 12/1994 | Kempf . | |
| 5,447,317 * | 9/1995 | Gehlsen et al. .................. | 414/921 X |
| 5,556,250 | 9/1996 | Fretwell et al. . | |
| 5,613,825 | 3/1997 | Dorn . | |

* cited by examiner

*Primary Examiner*—Frank E. Werner
(74) *Attorney, Agent, or Firm*—Douglas J. Christensen

(57) ABSTRACT

The present invention provides a robust, highly stable and vertically compact when folded-up wheelchair lift suitable for placement on a variety of vehicles such as vans and mini-vans. The lift has an elongate horizontal support member that is pivotally attached to a post fixed to the undercarriage of a vehicle. The horizontal support member supports the lifting mechanism and the wheelchair platform and is powered to swing the platform and lifting mechanism between a use position and a storage position. The lifting mechanism uses a pair of connecting links spaced lengthwise on the support member and connecting to the wheelchair platform in a four bar linkage arrangement generally in the form of a parallelogram. Both connecting links are rotated by bell cranks both of which are powered by the same hydraulic cylinder.

17 Claims, 5 Drawing Sheets

EXTERNALLY STOWED WHEELCHAIR LIFT

BACKGROUND OF THE INVENTION

This invention relates to lifts. More particularly, it relates to wheel chair lifts for vehicles.

Lift mechanisms which enable large and/or unwieldy articles to be transferred into and out of vehicles have been in existence for some time.

A number of lifts have been adapted for passenger vehicles to provide access for people with handicaps. Most of the prior art wheelchair lifts which are stowable on the exterior of vehicles require relatively extensive track systems or support structures on the undercarriage of the vehicles. These extensive tracks and support systems add weight to the vehicle and take up substantial amounts of space which limits their usage to certain full size vans or other large vehicles.

The prior art wheelchair lifts, which do not utilize the track systems or extensive support structures will typically provide attachment points that are quite close to each other on the wheelchair platform. This can cause stability problems and extreme stress in the areas of attachment between the platform and the lifting links. Attempts to increase the stability and rigidity such as by providing reinforcing structure on the platform will necessarily increase the weight which will be raised and lowered requiring more power and thus stronger and heavier structures for supporting the up and down drive lifting means. Examples of prior art lifts follows.

U.S. Pat. No. 3,263,835 to Lugash discloses a lift that is rotatably attached to an undercarriage of a truck. The lift comprises a platform which is raised or lowered by two sets of rotatable "pantographic" arms located at the sides of the platform and which are concurrently actuated by a hydraulic cylinder. This lift takes up a substantial amount of vertical space and thus would be difficult to use as a wheelchair lift mounted below the undercarriage on modern mini-vans.

U.S. Pat. No. 4,711,613 to Fretwell discloses a wheelchair lift rotatably attached to an undercarriage of a vehicle. The lift comprises a platform which is raised or lowered by a pair of adjacent parallel links located at one side of the platform. Power to the parallel links is provided by a hydraulic cylinder one end of which is attached to one of the parallel links, the other end of which is attached to the rotational support assembly. The platform is attached to the links at a centrally positioned region at two points quite close to each other on the side of the platform. This may cause operating difficulty or instability, particularly when the weight of the wheelchair is forward or rearward on the platform.

Another lift which is rotatably attached to a vehicle is disclosed in U.S. Pat. No. 4,026,387 to Abreu. In Abreu, a platform is attached at one corner to a dual purpose mechanism which is attached to an exterior side of a vehicle adjacent a door opening. The dual purpose mechanism raises and lowers the platform by means of powered telescoping shafts which serve to raise and lower the platform. The dual purpose mechanism also permits the platform to be rotated between operative and storage position. When the platform is in its stored position, the top surface of the platform abuts the undercarriage of the vehicle and frictionally retains the lift in its storage position. Again, the closely spaced attachment points of the lift mechanism to the platform can create operating and stability problems particularly when the weight of the wheelchair is distally positioned on the platform.

Another type of lift is disclosed in U.S. Pat. No. 4,134,504 to Salas. In Salas, a lift is attached to an undercarriage of a vehicle and is horizontally extended and retracted between operative and storage positions by a somewhat complex cable system. The lift comprises a platform which is raised or lowered by two sets of parallel arms located at the sides of the platform, and which are concurrently actuated by a hydraulic cylinder. Only one of the parallel arms of each set is powered.

Yet another type of lift is disclosed in U.S. Pat. No. 5,556,250 to Fretwell. The Fretwell '250 is similar to the Salas lift mechanism in that Fretwell '250 provides two sets of parallel arms located at the sides of a platform, the parallel arms are concurrently actuated by a hydraulic cylinder, and the lift mechanism is linearly extended and retracted between operative and storage positions by a complex gear and chain driven track system. Fretwell '250 also discloses an enclosure, attachable to the undercarriage of a vehicle into which the lift mechanism is positioned for storage.

SUMMARY OF THE INVENTION

The present invention provides a robust, highly stable and compact wheelchair lift suitable for placement on a variety of vehicles such as vans and mini-vans. The lift has an elongate horizontal support member that is pivotally attached to a post on the underside of a vehicle. The horizontal support member supports the lifting mechanism and the wheelchair platform and is powered to swing the platform and lifting mechanism between a use position and a storage position. The lifting mechanism uses a pair of connecting links spaced lengthwise on the support member and connecting to the wheelchair platform in a four bar linkage arrangement generally in the form of a parallelogram. Both connecting links are rotated by bell cranks both of which are powered by the same hydraulic cylinder.

A feature and advantage of the invention is that the horizontal support member extends along a substantial length of the platform and the connecting links are spaced lengthwise on the platform to provide a robust, stable, and compact design.

A further object of the invention is to utilize a four bar linkage arrangement in which the two pivot points on the wheelchair platform are substantially in horizontal alignment and the two pivot points on the horizontal support member are in substantial horizontal alignment. Moreover, when the platform is in its storage position all of the pivot points are in substantial horizontal alignment to facilitate a vertically compact configuration.

An object of the present invention is to provide a lift which can be easily attached to an undercarriage of a vehicle in its own enclosure.

Another object of the present invention is to provide a lift which can be easily moved between storage and operative positions.

Another object of the present invention is to provide a platform which can be easily raised and lowered through a large range of motion.

Another object of the present invention is to provide a lift mechanism which is easily assembled and maintained.

Another object of the present invention is to provide a lift mechanism which is compact and thus highly versatile and may be installed in a wide range of vehicle types.

Yet another object of the present invention is to provide an enclosure into which the lift is housed to protect the lift from the elements.

These and other objects of the present invention will be apparent from a reading of the specification and claims.

BRIEF DESCRIPTION OF THE DRAWINGS

Recognizing that the invention may be variously embodied, by way of example, a specific embodiment along with some modifications is described herein with reference to the accompanying drawings, in which.

DETAILED SPECIFICATION

In FIGS. 1A–1D, a vehicle A is illustrated with a lift 10 and an attachment structure configured as an enclosure 300 mounted to the undercarriage of the vehicle. The various component parts as described below may be readily fabricated from steel stock by conventional means. The enclosure 300 is mounted such that an opening 304 in the enclosure is adjacent an entryway C and floor D of vehicle A. While the lift 10 and the enclosure 300 are depicted as being attached for use with the passenger side of a vehicle, it is understood that the lift and the enclosure 300 may be attached adjacent any other suitable entryway of a vehicle. Additionally, it is noted that the lift 10 may be attached directly to the undercarriage of a vehicle without the enclosure 300, if desired. Further note that the lift 10 may be operated while the door B of an entryway C is either open or closed. For purpose of clarification throughout the specification, the following terms are defined as follows. The term "operative position" is construed to be the state from which loading and unloading of the platform in the raised and lowered positions takes place. In the "operative position" the horizontal support is generally perpendicular to the entryway of a vehicle. The term "storage position" is construed to be the state where the lift is effectively positioned beneath an undercarriage of a vehicle. The term "actuator" is construed to mean a device which capable of movement and may comprise linear motors, hydraulics, pneumatics, or mechanical devices such as threaded screws or linkages, all of which may be manually operated or powered.

Figure 1A:
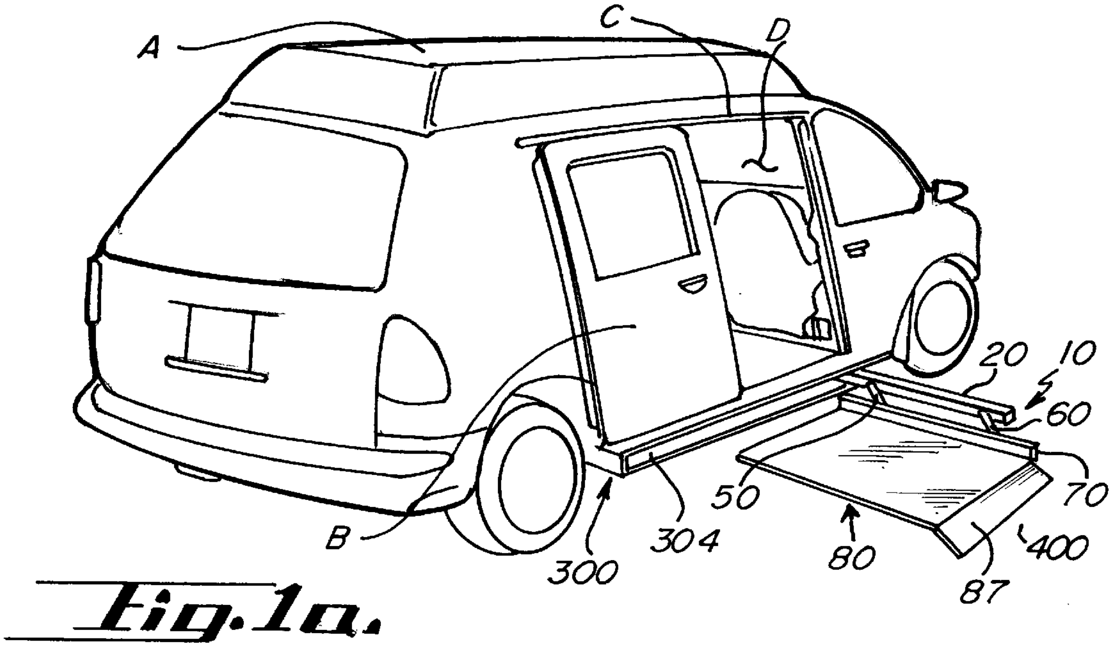
FIG. 1A depicts a perspective view of a vehicle incorporating the lift in accordance herewith and showing the lift in a lowered, operative position (where loading and unloading occur) wherein the platform is adjacent a loading surface.
Figure 1B:
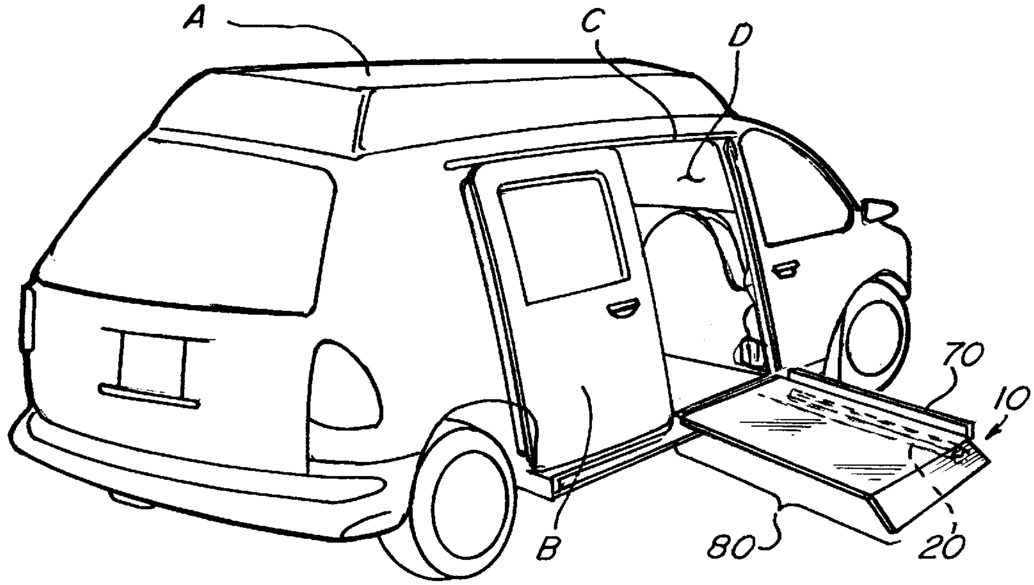
FIG. 1B depicts a perspective view of a vehicle incorporating the lift in accordance herewith and showing the lift in a raised, operative position (where loading and unloading occur) wherein the platform is adjacent an entryway and floor of a vehicle.

Turning to the individual figures, in FIG. 1A, the lift 10 has been swung about a vertical pivot pin (not shown in this view) from a stowed storage position to an operative position by a first actuator (not shown in this view) wherein a horizontal support 20 extends generally perpendicularly from an entryway C of a vehicle A. Here, a lift mechanism attached to a lift mechanism side of the horizontal support (not shown in this view) has been rotated in a clockwise direction (viewed from the platform side) by a second actuator (not shown in this view), causing first and second connecting links 50, 60 attached to the lift mechanism, to simultaneously rotate, thus lowering a platform support 70 and platform 80 to a lowered position adjacent a loading surface. As will be later shown and described in additional figures, the first and second connecting links 50, 60 are attached to the lift mechanism by first and second attachment pins which are rotatably received by first and second apertures in the horizontal support 20. Note that when platform 80 contacts a loading surface, a safety roll-off plate 87 is rotated from a generally vertical position to a generally horizontal position, thereby facilitating loading.

In FIG. 1B, the lift 10 is again in the operative position wherein the horizontal support 20 extends generally perpendicularly from an entryway C of a vehicle A. Here, the lift mechanism attached to a lift mechanism side of the horizontal support (not shown in this view) has been rotated in a counterclockwise direction viewed from the platform side by the second actuator (not shown in this view), causing the first and second connecting links attached to the lift mechanism, to simultaneously rotate, thus raising the platform support 70 and platform 80 to a raised position adjacent the entryway C and floor D of the vehicle A. As will be later shown and described in additional figures, the first and second connecting links are attached to the lift mechanism by first and second attachment pins which are rotatably received by first and second apertures in the horizontal support 20. Note that when the platform 80 is not in contact with a loading surface, the safety roll-off plate 87 is biased in a generally vertical position, thereby preventing accidental unloading.

Figure 1D:
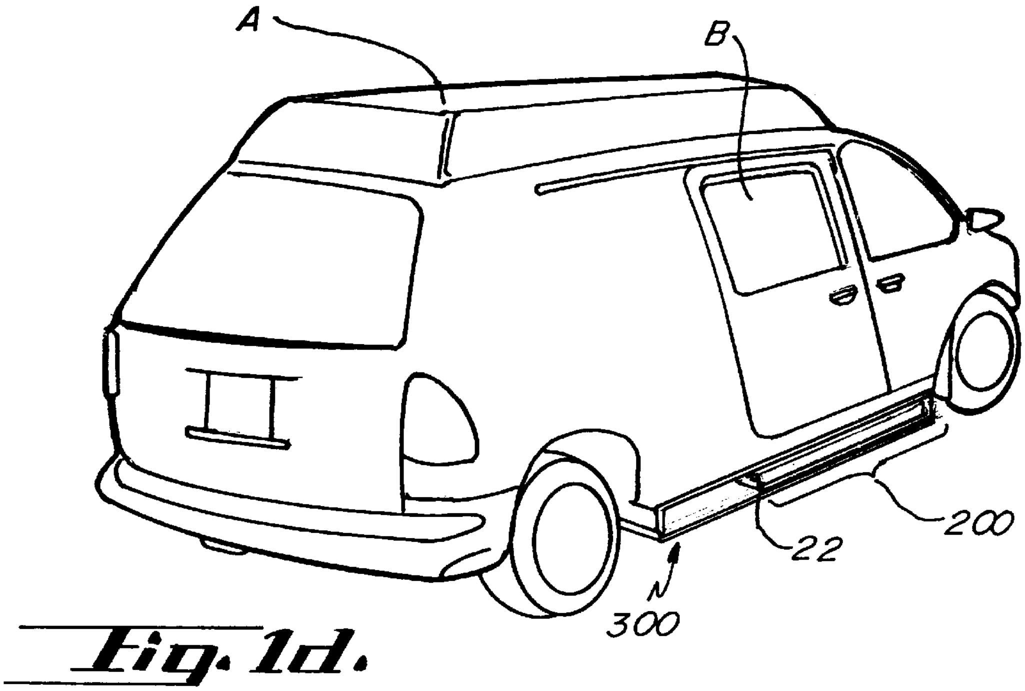
FIG. 1D depicts a perspective view of a vehicle incorporating the lift in accordance herewith and showing the lift in the stored position within an enclosure attached to the undercarriage of a vehicle.
Figure 1C:
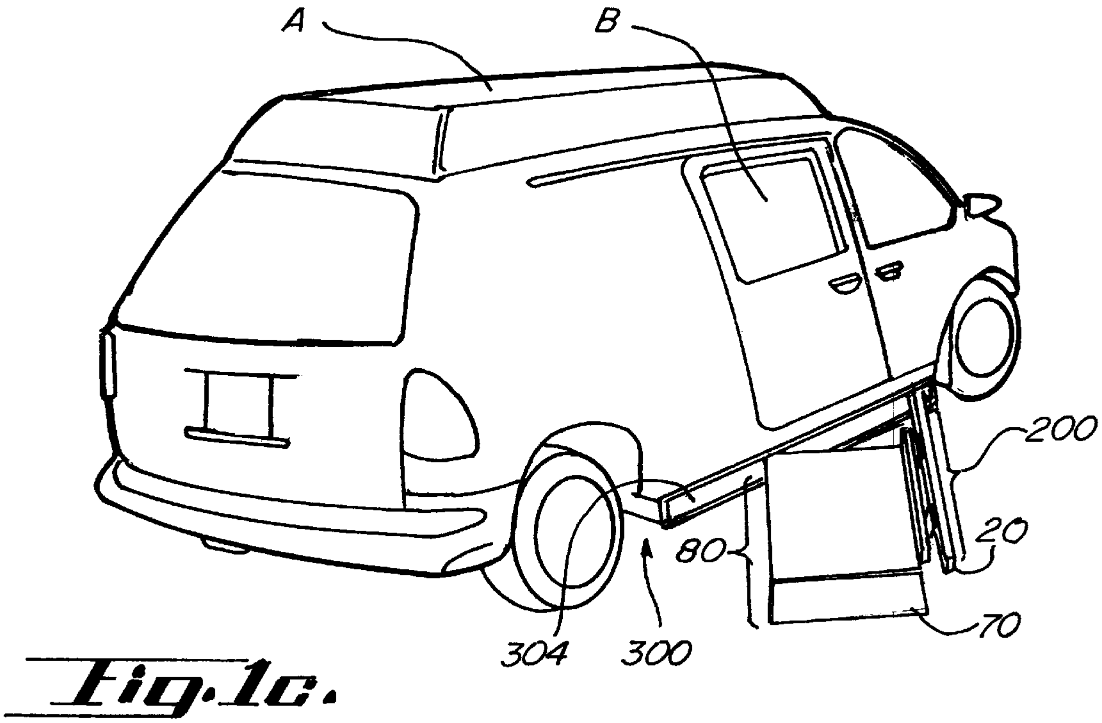
FIG. 1C depicts a perspective view of a vehicle incorporating the lift in accordance herewith and showing the lift in transition as the horizontal support is rotated about a vertical pivot pin between storage and operative positions.

In FIG. 1C, the lift 10 is at an intermediate position midway between storage and operative positions as depicted in FIGS. 1D and 1A, respectively. Note that the platform 80, has been positioned such that it is generally coextensive with the plane of the horizontal support 20. The horizontal support 20, along with the lift mechanism 200, platform support 70 and platform 80 are then rotated about a vertical pivot pin (not shown in this view). As shown in the figure, vehicle A has been equipped with an enclosure 300, and the lift 10 is swung into an opening 304 in the enclosure 300 to the storage position beneath the undercarriage of the vehicle A.

In FIG. 1D, the lift is in the storage position. Note that in the storage position, only the lift mechanism side 22 of the horizontal support 20 and the lift mechanism 200 are visible.

Figure 2:
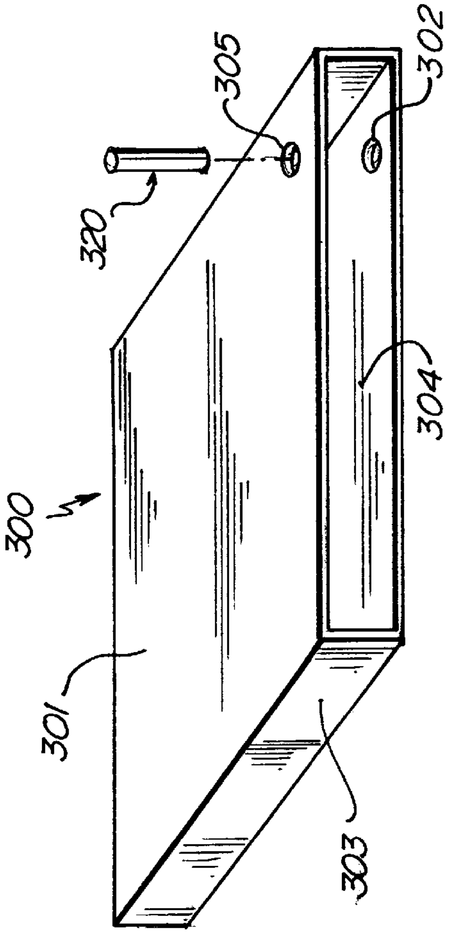
FIG. 2 is a perspective view of the lift enclosure.

The enclosure 300, as depicted in FIG. 2, comprises a top plate 301 and a bottom plate (not shown in this view) which are parallel to each other and similarly shaped. The top and bottom plates are attached to, and spaced apart from each other by a sidewall 303 along a portion of their perimeters. The sidewall 303 does not extend entirely around the perimeters of the top and bottom plates of the enclosure. Rather, a segment of the top and bottom plates is not attached to the sidewall thus forming an opening 304 which is sized to accept passage of the lift. An aperture 305 is located in the top plate adjacent to one side of the opening 304 and a corresponding aperture 302 is located in the bottom plate adjacent to one side of the opening, to receive a vertical pivot pin 320 which supports the lift. The interior of the enclosure includes a projection or structure which serves as an attachment for a first end of a first actuator. The enclosure 300 comprises an attachment structure may be fixedly attached to an undercarriage of a vehicle by any suitable means, such as bolts, rivets, welds, etc. While it is understood that the lift may be used with or without the attachment structure configured as an enclosure 300, it is preferred to use the lift in conjunction with such an enclosure because the structure provides support for the vertical pivot pin 320 and also protects the lift from the elements. Alternatively, a bracket could support the pivot pin 320 and be attached to the vehicles undercarriage.

Figure 3:
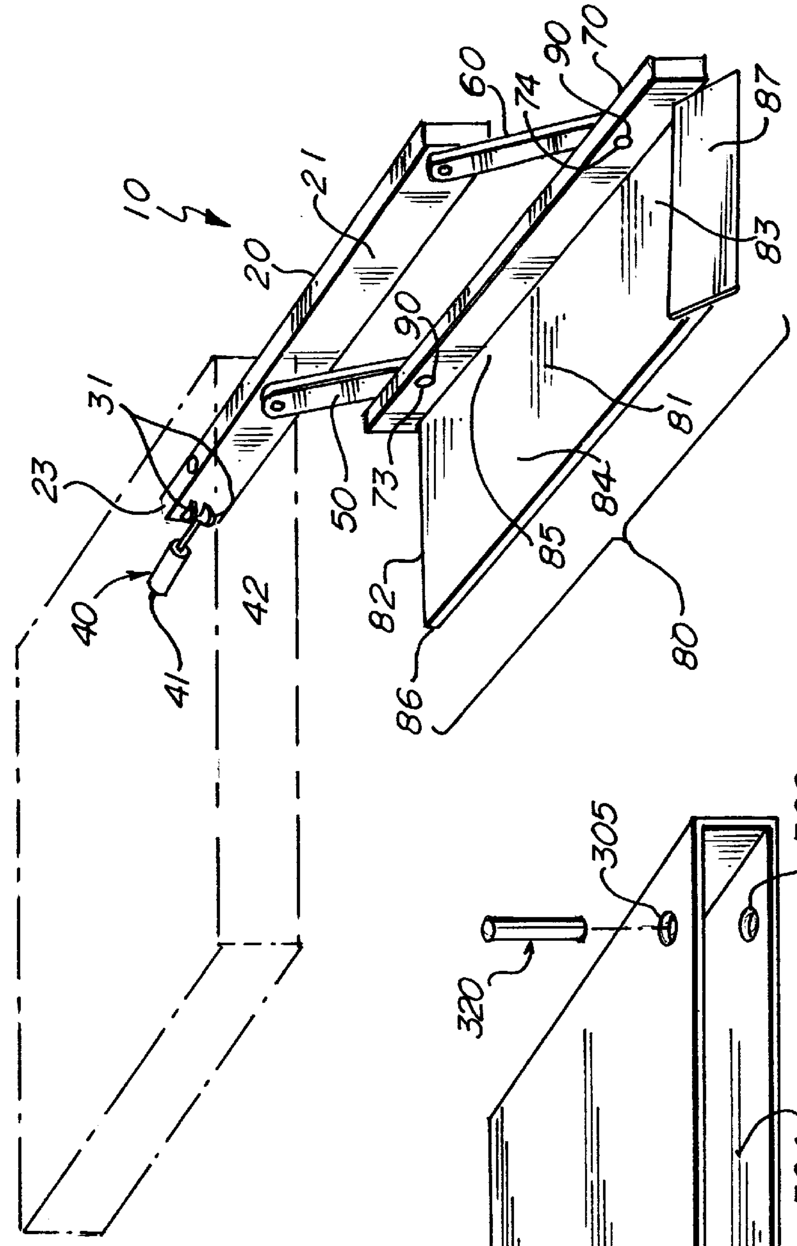
FIG. 3 is a perspective view of the lift from the connecting link side of the horizontal support as the lift is in the lowered, operative position.

The arrangement of the lift 10 in relation to the horizontal support 20 can be better appreciated in FIG. 3. In FIG. 3, the lift 10 has been rotated about the vertical pivot pin (not shown in this view) from the storage position (denoted by dashed lines which form the outline of the enclosure) to the operative position by the first actuator 40. The first actuator 40 has a first end 41 which is attached to the attachment or some other appropriate anchor point structure and a second end 42 which is attached by flanges 31 for example, near the inboard end 23 of the horizontal support 20, on the connecting link side 21. As shown in the figure, the platform 80 has been lowered so that it is adjacent to a loading surface. Briefly, the platform 80 includes a platform support 70 which in turn is movably connected to the horizontal support 20 by first and second connecting links 50, 60. In more detail, the platform 80 comprises a generally rectangularly shaped deck 81 having an inboard end 82, an outboard end 83, and opposing sides 84, 85. A side rail 86 is fixedly attached to one side 84 of the deck 81, and the platform support 70 is fixedly attached to the opposing side 85 of the deck 81. A safety roll-off plate 87 is hingedly attached to the outboard end 83 of the deck and provides a transition between the deck 81 and a loading surface. As will be later shown and described in additional figures, the platform support 70 and the horizontal support 20 each have been provided with a pair of parallel, horizontally oriented first and second apertures which are sized to rotatably receive attachment pins which are affixed to and project from the first and second connecting links. The horizontal support 20 and the platform support 70 may be provided with friction reducing elements such as grease fittings, or bearings to reduce friction between the attachment pins as they rotate within the horizontally oriented first and second apertures of the platform support and the horizontal support, respectively. The first and second connecting links attach to the horizontal support at a first pair 90 of pivot points. A second pair 91 of pivot points connect the wheelchair platform to the connecting links. The platform, the horizontal support, and the platform support form a parallelogram. Such an arrangement enables the platform to remain parallel to the horizontal support as it is raised and lowered. It is understood, however, that the lengths of the linkages may be varied as desired to permit other lifting and lowering motions.

Figure 4:
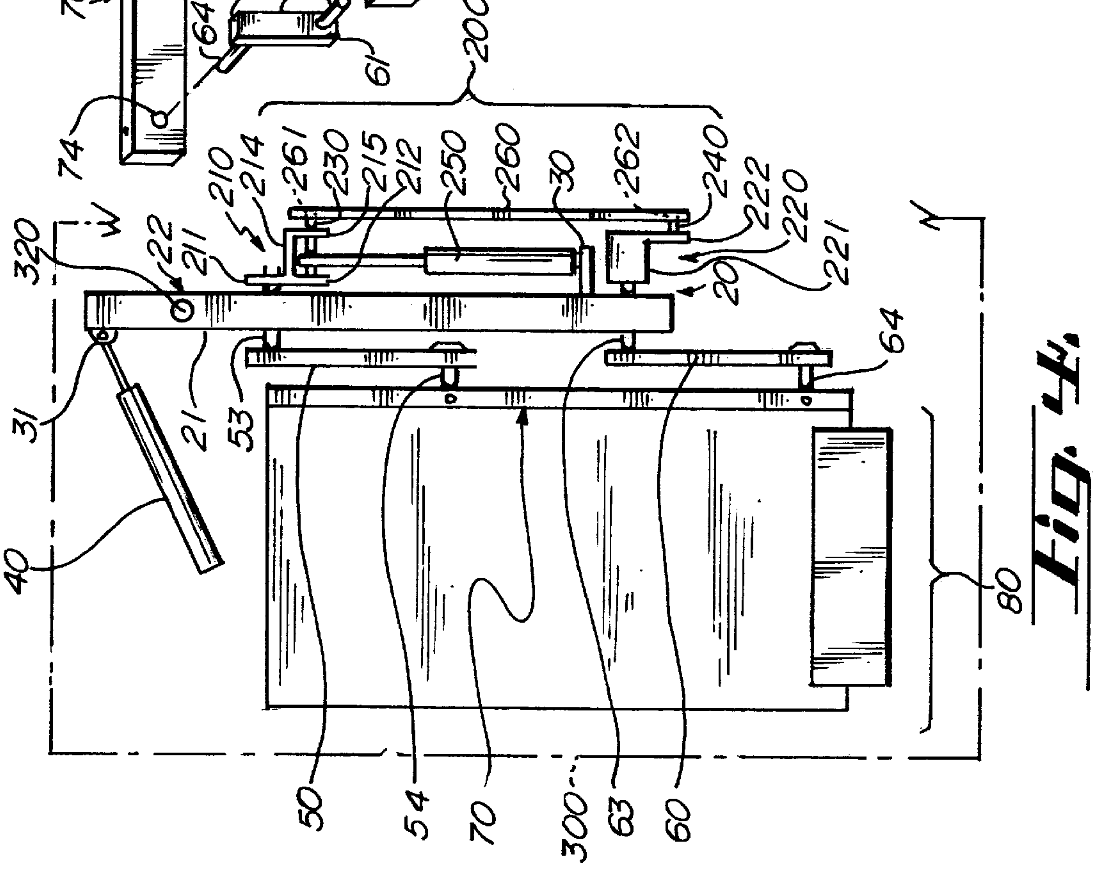
FIG. 4 is a top view of the lift as it is configured in the storage position beneath an undercarriage of a vehicle.

The entire lift may be better appreciated in FIG. 4. This is a top view showing the lift as it appears in the storage position within the enclosure 300 (depicted in dashed lines). Initially, one can observe that the first actuator 40 is in an extended mode. In the extended mode, the first actuator 40 pushes against the flanges 31 of the horizontal support 20 and rotates the horizontal support 20 about a vertical pivot pin 320. In this figure, the horizontal support 20 is parallel with an entryway of a vehicle to which it is attached. Different views of the lift 10 as it appears in the operative position can be seen in FIGS. 5 and 6. Referring back to FIG. 4, and the lift itself, it can be seen that one side of the platform 80 is attached to the platform support 70 and that the platform support 70 is attached to the first and second connecting links 50, 60 by attachment pins 54, 64, respectively. It can also be seen that a first and second attachment pins 53, 63 are attached to the first and second connecting links and extend through first and second A apertures of the horizontal support from the connecting link side 21 to a lift mechanism side 22, where they are attached to a lift mechanism 200. The lift mechanism 200 comprises a first bell crank 210, a second bell crank 220, a rod 260 and a second actuator 250. The first bell crank 210 is adjustably affixed to the first attachment pin 53. The first bell crank comprises an attachment collar 211, a first arm 212 which extends radially from the attachment collar, a spacer 214 which extends orthogonally from the first arm and a second arm 215 which extends orthogonally from the spacer such that the first and second arms are parallel and coincident with each other. Each of the first and second arms are provided with an aperture, sized to receive a fifth attachment pin 230.

The second bell crank 220 is adjustably affixed to the second attachment pin. The second bell crank comprises an attachment collar 221 and a first arm 222 which extends radially from the attachment collar. The first arm of the second bell crank is provided with an aperture, sized to receive a sixth attachment pin 240. A rod 260, with first and second apertures 261, 262, is rotatably attached to ends of the fifth and sixth attachment pins, respectively so that power may be transmitted from the first bell crank 210 to the second bell crank 220. Power to rotate the first bell crank is supplied by a second actuator 250. The second actuator has a first end 251 and a second end 252, with the first end positioned between the first and second arms 211, 215 of the first bell crank 210, and rotatably connected to the fifth attachment pin 230, and the second end 252 of the second actuator 250 is connected to a mounting bracket 30 on the lift mechanism side of the horizontal support 20. In the preferred embodiment, the longitudinal axis of the first and second bell cranks are offset from the longitudinal axis of the first and second connecting links by about 50 degrees to avoid having the second actuator and the first and second bell cranks line up at top dead center. It is understood, however, that the amount of offset may be varied without departing from the spirit and scope of the invention.

Figure 5:
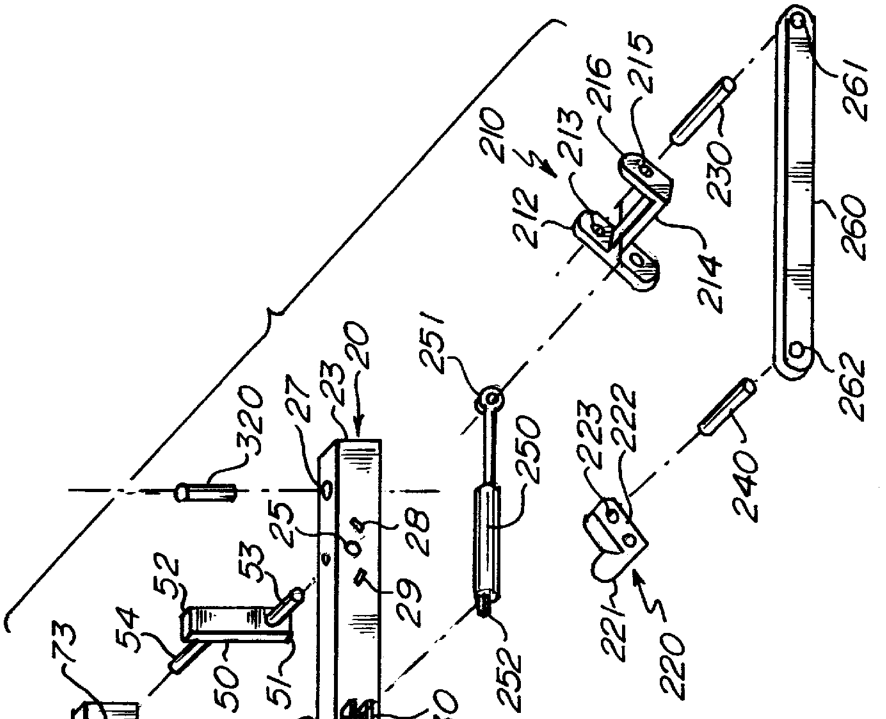
FIG. 5 is a partially exploded perspective view of the lift mechanism from the lift mechanism side of the horizontal support while the lift is in the raised, operative position.

The various components of the lift mechanism along with the horizontal support, first and second connecting links and the platform support can be seen from a different perspective in FIG. 5. Starting with the connecting links, the first and second connecting links 50, 60 have first and second ends, with the first ends 51, 61 of the first and second connecting links having first and second attachment pins 53, 63, respectively, which project orthogonally from the longitudinal axis of the first and second connecting links 50, 60 in one direction, and the second ends 52, 62 of the first and second connecting links 50, 60 having third and fourth attachment pins 54, 64, respectively, which project orthogonally from the longitudinal axis of the first and second connecting links in a direction opposite from the direction of the first and second attachment pins 53, 63 at the first ends 51, 61 of the first and second connecting links 50, 60. To assemble the connecting links to the horizontal support and the platform support, the first and second attachment pins 53, 63 are inserted into the first and second apertures 25, 26 of the horizontal support 20 from the connecting link side of the horizontal support 21, and that the third and fourth attachment pins 54, 64 are inserted into the first and second apertures of the platform support 73, 74 from a connecting link side 71 toward the platform facing side 72. The third and fourth attachment pins are rotatably retained in the first and second apertures of the platform support in a conventional manner, such as circlips, washers and nuts, or the like (not shown).

As described earlier, the first and the second attachment pins 53, 63 project through the first and second apertures 25, 26 of the horizontal support where they are adjustably affixed to first and second bell cranks 210, 220 which form part of the lift mechanism 200. The lift mechanism 200 comprises a first bell crank 210, a second bell crank 220, a rod 260 and a second actuator 250. The first bell crank 210 is adjustably affixed to the first attachment pin 53. The first bell crank comprises an attachment collar 211, a first arm 212 which extends radially from the attachment collar, a spacer 214 which extends orthogonally from the first arm and a second arm 215 which extends orthogonally from the spacer such that the first and second arms are parallel and coincident with each other. Each of the first and second arms are provided with an aperture 213, 216, sized to receive a fifth attachment pin 230. The second bell crank 220 is adjustably affixed to the second attachment pin. The second bell crank comprises an attachment collar 221 and a first arm 222 which extends radially from the attachment collar. The first arm of the second bell crank is provided with an aperture 223, sized to receive a sixth attachment pin 240. A rod 260, with first and second apertures 261, 262, is rotatably attached to ends of the fifth and sixth attachment pins, respectively so that power may be transmitted from the first bell crank 210 to the second bell crank 220. Power to rotate the first bell crank is supplied by a second actuator 250. The second actuator has a first end 251 and a second end 252, with the first end positioned between the first and second arms 211, 215 of the first bell crank 210, and rotatably connected to the fifth attachment pin 230, and the second end 252 of the second actuator 250 is connected to a mounting bracket 30 on the lift mechanism side of the horizontal support 20. The offset angle between the first and second bell cranks and the first and second connecting links can be seen wherein the offset angle is approximately 50 degrees.

The lift mechanism side 22 of the horizontal support includes a first stop 28 and a second stop 29 located on either side of the first aperture 25, wherein the first and second stops limit the rotational motion of the first bell crank 210 by coming into contact with the first arm 212 of the first bell crank. The horizontal support 20 is provided with a vertical aperture 27 near the inboard end 23, which is sized to rotatably receive a vertical pivot pin 320. The horizontal support 20 is rotatably attached to the vertical pivot pin 320 in a conventional manner such as a thrust bearing or washer attached onto the bottom of the vertical pivot pin.

Figure 6:
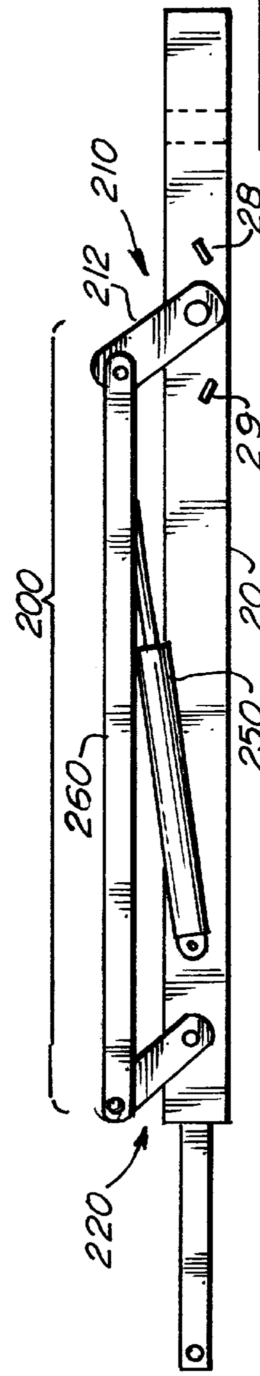
FIG. 6 is a side view of the lift mechanism from the lift mechanism side of the horizontal support while the lift mechanism is in the storage position.

FIG. 6. shows the lift viewed from the lift mechanism side 22 of the horizontal support 20 while the lift is in the operational position. From this position, the lift may be raised, lowered, or rotated between the operative and the storage positions. The lift mechanism 200 depicted shows the first bell crank 210, the second bell crank 220, the second actuator 250 and the rod 260 which is rotatably attached to the first and second bell cranks as shown and described earlier in FIGS. 4 and 5. Returning to FIG. 6, the offset angle between the longitudinal axis of the second connecting link and the longitudinal axis of the second bell crank can be seen. Although the preferred offset angle is around 50 degrees, it can be varied without departing from the spirit and scope of the invention. FIG. 6 also shows the first and second stops 28, 29 as they are positioned on the lift mechanism side of the horizontal support on either side of the first aperture. The purpose of the first and second stops is to limit the motion of the first bell crank 210, and thus limiting the motion of the lift mechanism 200. In operation, the stops 28, 29 come into contact with the first arm 212 of the first bell crank 210 as the first bell crank is rotated by the second actuator 250. It is understood that the first and second stops may be positioned on either side of the first aperture to provide various ranges of motion for the lift mechanism, and subsequently the platform attached thereto.

As can be seen the horizontal support member is approximately the length of the platform. Although, the length is not critical it should be at least one third the length of the platform to allow for sufficient spacing of the pivot points on the horizontal support member and the platform.

Figure 7A:
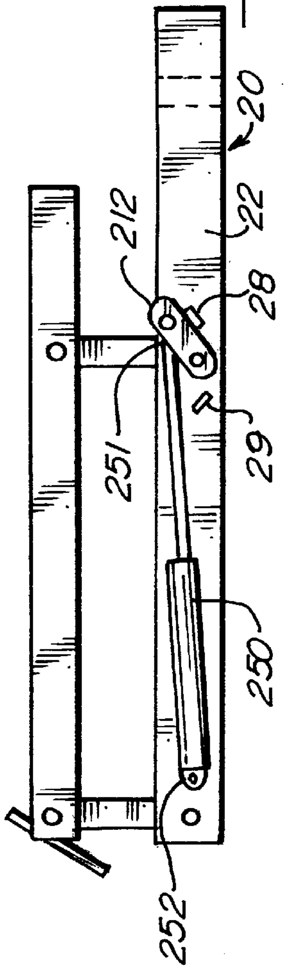
FIG. 7A is a side view of the lift from the lift mechanism side of the horizontal support similar to FIG. 6, but without the second bell crank and connecting rod. The figure depicts the lift mechanism in its raised position.

The operation of the lift as it translates from a raised to a lowered position while in the operative position is illustrated in FIGS. 7A, B7, and 7C. These figures do not show the second bell crank or the rod which is rotatably connected between the first and second bell cranks as shown in FIG. 6. They do serve, however, to illustrate the range of motion which may be achieved with the lift mechanism of the present invention.

In FIG. 7A, the lift is in an elevated position where the deck of the platform (not shown) is adjacent the floor of a vehicle. To elevate the lift, the first 251 and the second end 252 of the second actuator 250 are extended away from each other, thus rotating the lift mechanism in a clockwise direction when viewed from the lift mechanism side 22 of the horizontal support 20. Although the first arm 212 of the first bell crank 210 is depicted as being in contact with the first stop 28, it is clear that rotation of the first bell crank can be stopped before the first arm 212 comes into contact with the first stop.

Figure 7B:
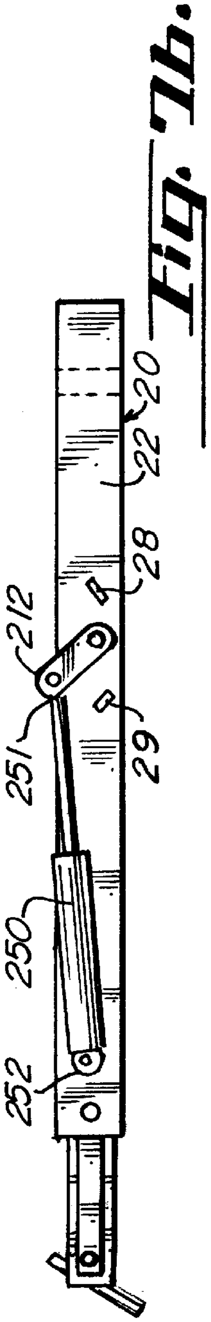
FIG. 7B is a side view of the lift from the lift mechanism side of the horizontal support similar to FIG. 6, but without the second bell crank and connecting rod. The figure depicts the lift mechanism in transition between raised and lowered positions.

In FIG. 7B, the lift is midway between the raised position and the lowered position wherein the lift is in the same plane as the horizontal support 20. To lower the lift, the first and second ends 251, 252 of the second actuator 250 are drawn towards each other, thereby rotating the lift mechanism in a counter clockwise direction when viewed from the lift mechanism side of the horizontal support. Note that the first arm 212 of the first bell crank is between the first and second stops 28, 29.

Figure 7C:
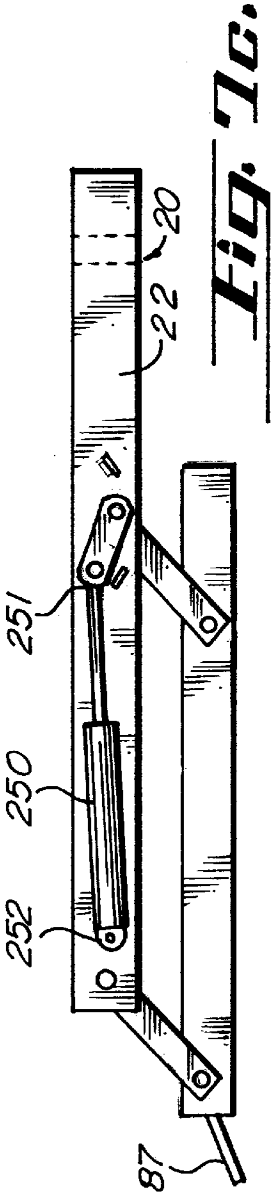
FIG. 7C is a side view of the lift from the lift mechanism side of the horizontal support similar to FIG. 6, but without the second bell crank and connecting rod. The figure depicts the lift mechanism in its lowered position.

In FIG. 7C, the lift is in a lowered position where the deck of the platform (not shown) is adjacent a loading surface 400. To position the platform so that it is adjacent a loading surface, the first and second ends 251, 252 of the second actuator 250 are drawn further towards each other, as depicted in FIG. 7B, thereby further rotating the lift mechanism in a counter clockwise direction when viewed from the lift mechanism side 22 of the horizontal support 20. Note that the safety roll-off plate 87, when in contact with a loading surface, is rotated to a generally horizontal position to facilitate loading.

The general operation of a lift in accordance with the embodiment of the present invention illustrated in FIGS. 1A, 1B, 1C, and 1D will now be described. Starting from the storage position as shown in FIG. 1D, to utilize the lift while outside a vehicle, a person will perform the following steps. First, the lift will be rotated about the vertical pivot pin to the operative position. Then the platform will be lowered adjacent to a loading surface. The object to be transported is loaded onto the deck of the platform. The platform is then elevated until the surface of the deck is level with the floor of the vehicle. The object is then moved into the vehicle. The lift is then lowered until the platform is in the same horizontal plane as the horizontal support. From here, the lift is rotated about the vertical pivot pin into the storage position. To remove and object from the, the steps are reversed.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A vehicle comprising an undercarriage and a wheelchair lift attached to the undercarriage, the lift comprising:

an elongate horizontal support member pivotally attached to the undercarriage to swing in a substantially horizontal plane between a storage position below the undercarriage and a operating position extending outwardly from the vehicle;

first and second connecting links pivotally connected to the horizontal support member at a first pair of pivot points whereby said first and second connecting links can swing upwardly and downwardly about said pivot points, said first pair of pivot points horizontally spaced along the elongate horizontal support member;

a wheelchair platform having an inboard end, an outboard end, and a pair of sides, the wheelchair platform connected to the first and second connecting links at a second pair of horizontally spaced pivot points, said second pair of pivot points positioned on one of the sides of the wheelchair platform with one of the second pair of pivot points positioned adjacent the inboard end and the other positioned adjacent the outboard end, the wheelchair platform, the first and second connecting links, and the elongate horizontal support member forming a four-bar linkage whereby when the elongate horizontal support member is in the operating position the wheelchair platform is raiseable and lowerable between a raised position whereby the connecting links are directed upwardly from the first pivot points, through an intermediate position whereby the connecting links are substantially horizontal and a lowered position wherein the connecting links are directed downward from the pivot points, a first bell crank fixedly connected to said first connecting link and positioned opposite the first and second connecting links with respect to the elongate horizontal support member; and a powered cylinder connected between said bell crank and the horizontal support member, the powered cylinder extending along the elongate horizontal support member, whereby said first connecting link is powered.

2. The vehicle of claim 1, further comprising a second bell crank fixedly connected to the second connecting link, the second bell crank in connecting relation to the powered cylinder whereby the first and second connecting links are powered to raise and lower the wheelchair platform.

3. The vehicle of claim 1 wherein both the first connecting link and second connecting link are both powered by the powered cylinder for raising and lowering the wheelchair platform.

4. The vehicle of claim 1 further comprising an enclosure for containment of the wheelchair platform when the horizontal support member is in the storage position.

5. The vehicle of claim 1 wherein the first and second connecting links are are positioned opposite the powered cylinder with respect to elongate horizontal member.

6. The vehicle of claim 5 wherein the said first and second connecting links are configured such that when in said intermediate position said links are positioned in horizontal alignment with and between the horizontal support member and the wheelchair platform.

7. The vehicle of claim 1 wherein the wheelchair platform is positionable in horizontal alignment with the horizontal support member at the storage position for said wheelchair platform and wherein in said storage position the horizontal support member runs horizontally with and parallel to the wheelchair platform and wherein in said storage position the first and second connecting links lay horizontally intermediate said horizontal support member and the wheelchair platform.

8. The vehicle of claim 1 wherein the horizontal support member is powered to swing said support member between the storage position and the operating position.

9. The vehicle of claim 1 wherein at the storage position the first and second connecting links are positioned in a horizontal position lying end to end with respect to each other and positioned in between the horizontal support member and the wheelchair platform.

10. A wheelchair lift attachable to the undercarriage of a vehicle, the lift comprising:

a bracket and a pin supported by the bracket, the bracket and pin attachable to the undercarriage of the vehicle;

an elongate horizontal support member pivotal about the pin and thereby swingable in a substantially horizontal plane between a storage position with the elongate support member adjacent to the vehicle and an operating position with the horizontal member extending outwardly from the vehicle;

a powered cylinder connected between the elongate horizontal support member and the undercarriage to swing the support member between the storage position and the operating position;

first and second connecting links pivotally connected to the horizontal support member at a first pair of horizontally spaced pivot points whereby said links are swingable upwardly and downwardly about said pivot points;

a wheelchair platform having a inboard end, an outboard end, and a pair of sides, the wheelchair platform connected to the first and second connecting links opposite the support member at a second pair of horizontally spaced pivot points one of said pivot points positioned adjacent the inboard end and the other adjacent the outboard end whereby said first and second links are pivotal about said second pair of horizontally spaced pivot points, a powered cylinder connecting to at least one of the connecting links whereby the pair of connecting links are powered to raise and lower the wheelchair platform.

11. The wheelchair lift of claim 10, further comprising a first bell crank fixedly connected to said first connecting link and rotatably attached to the elongate horizontal support member and the powered cylinder connected between said bell crank and the horizontal support member whereby said first connecting link through said bell crank.

12. The wheelchair lift of claim 11, further comprising a second bell crank fixedly connected to the second connecting link, the second bell crank in connecting relation to the powered cylinder whereby the first and second connecting links are powered to raise and lower the wheelchair platform.

13. The wheelchair lift of claim 10 wherein both the first connecting link and the second connecting link are both powered by the powered cylinder for raising a lowering the wheelchair platform.

14. The wheelchair lift of claim 10 further comprising an enclosure for containment of the wheelchair platform when the horizontal support member is in the storage position.

15. The wheelchair lift of claim 10 wherein the first and second connecting links are configured to rotate to a horizontal position lying end to end with respect to each other defining a storage position for said connecting links.

16. The wheelchair lift of claim 10 wherein the wheelchair platform is positionable in horizontal alignment with the horizontal support member defining a storage position for said wheelchair platform and wherein in said storage position the horizontal support member runs horizontally with and parallel to the wheelchair platform and wherein in said storage position the first and second connecting links lay horizontally intermediate said horizontal support member and the wheelchair platform.

17. A wheelchair lift mountable under a vehicle, the vehicle having an undercarriage, the lift comprising:

a bracket with a vertical pin mountable to the undercarriage, an elongate horizontal support member pivotally attached with respect to the vertical pin of the bracket to swing in a substantially horizontal plane between a storage position where the horizontal support member lies adjacent the vehicle and an operating position where said horizontal support member extends outwardly from the vehicle when said bracket is mounted to the vehicle;

first and second connecting links pivotally connected to the horizontal support member at a first pair of pivot points; and a wheelchair platform connected to the first and second connecting links opposite the support member at a second pair of pivot points, a bell crank connected to at least one of the links, and a powered cylinder connected to the bell crank for raising and lowering the wheelchair platform, the horizontal support member powered to swing between the storage position and the operating position.

* * * * *